United States Patent
Watkins et al.

(10) Patent No.: US 11,270,290 B2
(45) Date of Patent: Mar. 8, 2022

(54) SYSTEMS AND METHODS FOR USE IN FACILITATING NETWORK TRANSACTIONS

(71) Applicant: MASTERCARD INTERNATIONAL INCORPORATED, Purchase, NY (US)

(72) Inventors: Ryan Watkins, Brooklyn, NY (US); Sachin Ahuja, Millstone Township, NJ (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 49 days.

(21) Appl. No.: 16/416,559

(22) Filed: May 20, 2019

(65) Prior Publication Data

US 2019/0354958 A1 Nov. 21, 2019

Related U.S. Application Data

(60) Provisional application No. 62/674,227, filed on May 21, 2018.

(51) Int. Cl.
*G06Q 20/34* (2012.01)
*G06F 9/54* (2006.01)
(Continued)

(52) U.S. Cl.
CPC .......... *G06Q 20/351* (2013.01); *G06F 9/547* (2013.01); *H04L 9/30* (2013.01); *H04L 9/3073* (2013.01);
(Continued)

(58) Field of Classification Search
CPC ............. G06Q 20/351; G06Q 20/3829; G06Q 2220/00; G06F 9/547; H04L 9/3073
See application file for complete search history.

(56) References Cited

U.S. PATENT DOCUMENTS

2009/0024471 A1 1/2009 Nielson et al.
2011/0246406 A1* 10/2011 Lahav .................... G06N 5/046
706/46
(Continued)

FOREIGN PATENT DOCUMENTS

KR 10-2018-0039470 4/2018
WO WO2017/189917 11/2017

OTHER PUBLICATIONS

Rui Wang; Shuo Chen; XiaoFeng Wang; Shaz Qadeer; "How to Shop for Free Online—Security Analysis of Cashier-as-a-Service Based Web Stores;" IEEE; dated May 2011 https://ieeexplore.ieee.org/document/5958046?source=IQplus (Year: 2011).*

(Continued)

*Primary Examiner* — Elda G Milef
*Assistant Examiner* — Raven E Zeer
(74) *Attorney, Agent, or Firm* — Harness, Dickey & Pierce, P.L.C.

(57) ABSTRACT

Systems and methods are provided for facilitating network transactions. One exemplary method includes converting, by a communication device, a request from a remote payment initiator associated with a merchant into a message to a payment network, via a software development kit (SDK) executed by a web browser of the communication device. The request is associated with a transaction to a payment account and includes at least one of: a browser cookie, a payment account number associated with the payment account, a card ID for the payment account, and a payment ID for the transaction. And, the message includes the at least one of: the browser cookie, the payment account number, the card ID, and the payment ID.

6 Claims, 3 Drawing Sheets

(51) Int. Cl.
   *H04L 9/30*  (2006.01)
   *G06Q 20/38*  (2012.01)
(52) U.S. Cl.
   CPC ..... *G06Q 20/3829* (2013.01); *G06Q 2220/00* (2013.01); *H04L 2463/102* (2013.01)

(56) References Cited

U.S. PATENT DOCUMENTS

| | | | | |
|---|---|---|---|---|
| 2012/0011067 | A1* | 1/2012 | Katzin | G06Q 20/0855 705/44 |
| 2014/0279112 | A1 | 9/2014 | Ulrich et al. | |
| 2015/0019944 | A1* | 1/2015 | Kalgi | H04L 67/20 715/205 |
| 2015/0026049 | A1* | 1/2015 | Theurer | G06Q 20/227 705/41 |
| 2015/0220914 | A1* | 8/2015 | Purves | G06Q 20/36 705/26.8 |
| 2016/0314460 | A1* | 10/2016 | Subramanian | G06Q 20/32 |
| 2016/0350747 | A1* | 12/2016 | Pruthi | H04L 63/061 |
| 2017/0345105 | A1* | 11/2017 | Isaacson | G06Q 30/0633 |
| 2018/0096339 | A1* | 4/2018 | Maddern | G06N 5/022 |
| 2018/0109498 | A1* | 4/2018 | Singh | H04L 67/02 |

OTHER PUBLICATIONS

Refka Abdellaoui; Marc Pasquet; "Secure Communication for Internet Payment in Heterogeneous Networks;" IEEE; dated Apr. 2010 https://ieeexplore.ieee.org/document/5474833?source=IQplus (Year: 2010).*

Adam DuVander; "API Keys vs OAuth Tokens vs JSON Web Tokens;" zaiper; dated Mar. 2, 2017 https://zapier.com/engineering/apikey-oauth-jwt/ (Year: 2017).*

"Create credit card" by Spreedly, dated Apr. 8, 2016 https://docs.spreedly.com/reference/api/v1/#create-credit-card (Year: 2016).*

"Intro to the Node.js PayPal Rest SDK" by Traversy Media, dated Oct. 21, 2017 https://www.youtube.com/watch?v=7k03jobKGXM (hereinafter "Traversy") (Year: 2017).*

* cited by examiner

SYSTEMS AND METHODS FOR USE IN FACILITATING NETWORK TRANSACTIONS

CROSS-REFERENCE TO RELATED APPLICATION

This application claims the benefit of, and priority to, U.S. Provisional Application No. 62/674,227 filed on May 21, 2018. The entire disclosure of the above-referenced application is incorporated herein by reference.

FIELD

The present disclosure generally relates to systems and methods for use in facilitating network transactions.

BACKGROUND

This section provides background information related to the present disclosure which is not necessarily prior art.

Users are known to purchase products (e.g., goods, services, etc.) from merchants, either at physical locations, or at virtual locations. In connection with the purchases, the users, also referred to herein as consumers, are known to employ different means of funding the transactions, including credit cards, debit cards, checks, cash, etc. When using credit cards, or more broadly, payment accounts, at virtual merchant locations, it is known for the merchants to offer to consumers to store the payment account information in profiles associated with the consumers, whereby the merchants retain the payment account information for further purchases by the consumers. It is also known for the merchants to interact or integrate with virtual wallet platforms, whereby the consumers are able to use payment accounts provisioned to their virtual wallets to fund the transactions. Also, at virtual merchant locations, it is known for web browsers, such as, for example, the Chrome® web browser, etc., to offer to store payment account information for consumers for use by the consumers in later transactions at merchants initiated through the web browsers.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Virtual locations such as, for example, websites, etc., may be associated with merchants, and may include functionalities to improve checkout experiences of consumers at the merchants. When the virtual locations interact with the consumers, through a payment service provider (PSP), the PSP may include remote payment options as part of the consumers' experiences with the merchants. The remote payment options may be specific to a payment network, or specific to a virtual wallet platform. When a remote payment option involves multiple payment networks, it is needed to provide communication specific to each of the payment networks to facilitate payment account transactions.

Uniquely, the systems and methods herein provide a software development kit (SDK), or multiple SDKs, for use by a remote payment platform, whereby standard network transactions are converted to network transactions specific to the payment network(s) corresponding to the SDK(s). In particular, remote payments rely on a series of different operations, which are often consistent regardless of the payment network involved. The SDKs described herein provide conversion or translation of requests in a generic, standard form to a request or call specific to a corresponding payment network. In this manner, the remote payment platform is able to integrate with different payment networks, by including SDKs specific to the payment networks, while avoiding redefining and/or revising internal standards and/or internal requests.

Figure 1:
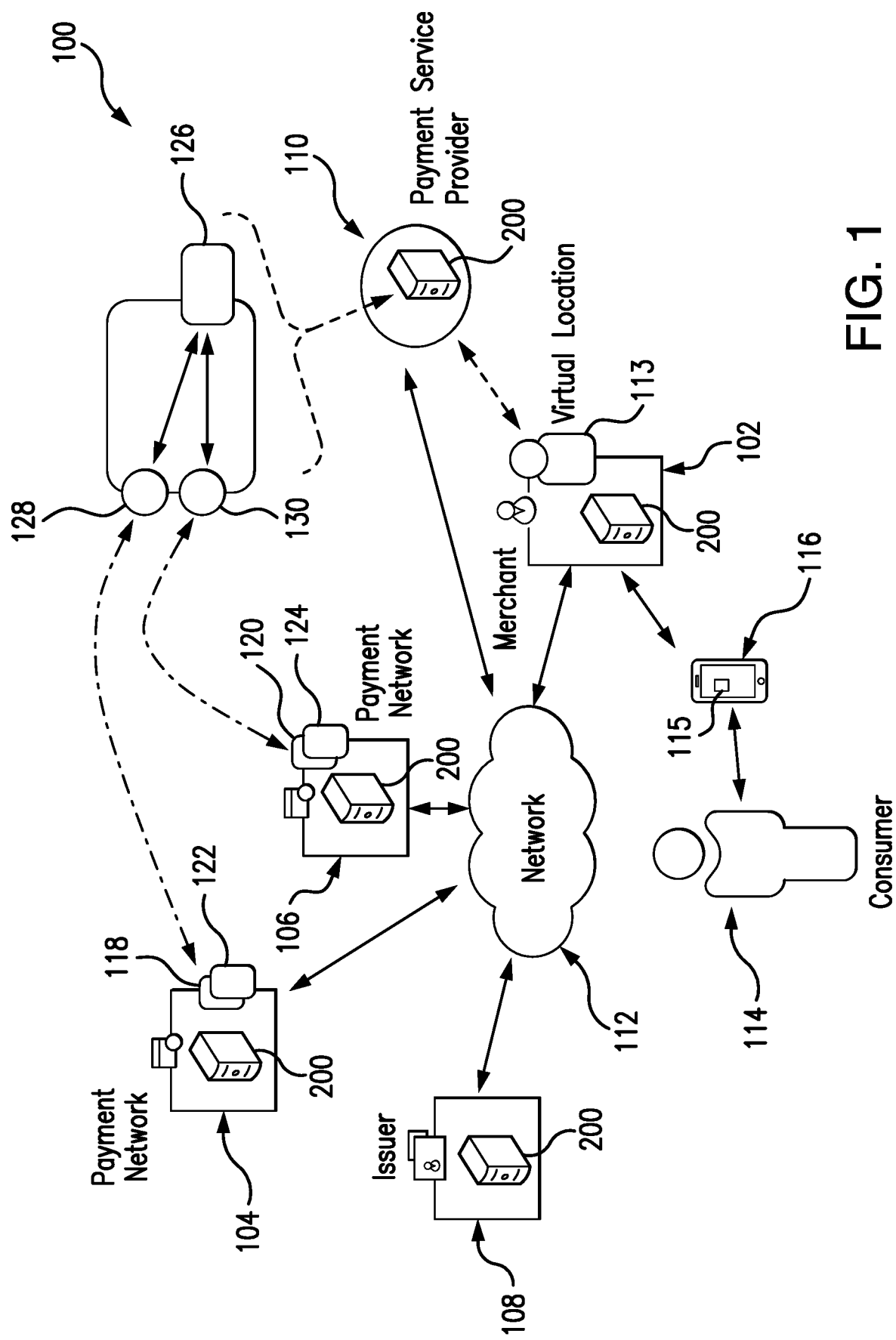
FIG. 1 illustrates an exemplary system of the present disclosure suitable for use in facilitating payment account transactions by consumers at virtual locations of merchants.

FIG. 1 illustrates an exemplary system 100 in which one or more aspects of the present disclosure may be implemented. Although the system 100 is presented in one arrangement, other embodiments may include systems arranged otherwise depending, for example, on processing of payment account transactions, merchants involved in payment account transactions, involvement of payment service providers or not in such transactions, numbers and/or types of payment networks, privacy concerns, etc.

In the illustrated embodiment, the system 100 generally includes a merchant 102, two payment networks 104 and 106, an issuer 108, and a payment service provider (PSP) 110, each coupled to (and in communication with) a network 112. The network 112 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 112 may include multiple different networks, such as a private payment transaction network made accessible by the payment network 106 to the issuer 108 and the PSP 110, and, separately, the public Internet, which is accessible as desired to the merchant 102, the payment network 106, the issuer 108, the PSP 110, and a communication device 116 associated with a consumer 114, etc.

The merchant 102 in the system 100 is generally associated with products (e.g., goods and/or services, etc.) offered for sale and sold to consumers, including the consumer 114. In the illustrated embodiment, the merchant 102 is or includes a virtual location 113 (e.g., a website, a network-based application, etc.), whereby products are offered for sale and sold through one or more interfaces displayed to the consumer 114 and other consumers remote from the merchant's location, etc. In such examples, the consumer 114, for instance, is permitted to browse product(s) through the one or more interfaces, add products to a "shopping cart," and checkout to purchase the products from the merchant 102 (all via the merchant's virtual location 113). It should be appreciated that when the virtual location 113 includes a website, as in FIG. 1, the website (and including the one or more interfaces associated therewith) are displayed to the consumer 114, for example, through a web browser 115 at the communication device 116. The web browser 115 may include, for example, the Chrome® browser, the Internet Explorer® browser, the Safari® browser, the Firefox® browser, etc.

In this exemplary embodiment, and as indicated by the dotted reference line in FIG. 1, the merchant 102 has agreed and/or contracted with the PSP 110 to provide payment services in connection with the virtual location 113 (e.g., as a remote payment initiator, etc.). As such, the PSP 110 is configured to integrate into and/or communicate with the virtual location 113, whereby the consumer 114 and other consumers are permitted to utilize remote payment options through the PSP 110 to facilitate purchases of products, etc., from the merchant 102 and which purchases are then to be funded by the consumers' payment accounts. The PSP 110 may include, for example, PayPal®, Stripe®, etc. That said, it should be appreciated that other merchants, especially merchants with sufficient resources, may act as their own PSPs, whereby the PSPs would not be separate from the merchants and operations attributed herein to the PSP 110 would be included in a backend computing device associated with the merchants and/or virtual locations associated therewith.

With continued reference to FIG. 1, the consumer 114 is associated with a payment account, which is issued to the consumer 114 by the issuer 108 and which is associated with (e.g., the payment network 104 is configured to process transactions performed by the consumer 114 to the payment account, etc.) the payment network 104. It should be appreciated that the consumer 114 may also be associated with one or more other payment accounts issued by the issuer 108 or by another issuer (not shown), and which are associated with the payment network 106. The consumer 114, in general, will use one or more of the payment accounts to fund purchases of products at the virtual location 113 of the merchant 102.

Each of the payment networks 104 and 106 in the system 100 is configured to facilitate payment account transactions between consumers and the merchant 102, for transactions that involve payment accounts associated with the particular one of the payment networks 104 and 106. In general, each of the payment networks 104 and 106 is configured to coordinate messaging between acquirers (not shown) (associated with merchants) and issuers (associated with consumers), to provide authorization, clearing and settlement for the transactions. In addition, in this exemplary embodiment, each of the payment networks 104 and 106 is configured to store payment account credentials for the consumers' payment accounts, which are made accessible to the PSP 110 in connection with remote payment at, for example, the virtual location 113 of the merchant 102.

More particularly, the payment network 104, for example, is configured to expose an application programming interface (API) 118 (e.g., a REST API, etc.) (or multiple such APIs) to the PSP 110 (as indicated by the dotted line in FIG. 1), associated with a function of payment accounts used in transactions processed by the payment network 104 and/or of the payment account transactions themselves (where different APIs of the payment network 104 may then be associated with different such functions). The API 118 will abide by types, formats and/or protocols specific to the payment network 104. Likewise, the payment network 106 is configured to expose an API 120 (or multiple such APIs) to the PSP 110 (as indicated by the dotted line in FIG. 1), each also associated with a function for facilitating payment account transactions (where different APIs of the payment network 106 may be associated with different such functions). The API 120 of the payment network 106 (and other APIs associated with the payment network 106), like the payment network 104, will include specific types, formats and/or protocols, etc., but which are generally different than the types, formats and/or protocols of the API 118 (or other APIs) of the payment network 104. What's more, the APIs 118 and 120 for each of the payment networks 104 and 106 will be configured to provide, without limitation, the following operations: get card (e.g., provide remembered payment accounts (e.g., remembered card(s)s, etc.), etc.), add card and checkout (e.g., add new cards and transition to checkout through a DCF (digital card facilitator), etc.), select card and checkout (e.g., select remembered cards and transition to DCF, etc.) and get payment information (e.g., return encrypted card data for checkout, etc.), etc.

With that said, while reference is made herein to a "card", it should be understood that such reference, broadly, is directed to a payment account and does not invoke and/or require the presence of or reference to a specific physical card (unless so stated). As such, a card, as used herein, may also be referred to as a payment account or to a payment account ID, etc.

With further reference to FIG. 1, the payment networks 104 and 106 are associated with digital card facilitators (DCFs) 122 and 124, respectively. The DCFs 122 and 124 are configured to facilitate remote transactions, by authenticating the consumer 114 (or other consumers) and providing payment account credentials as appropriate (e.g., following such authentication, etc.).

The PSP 110 in the system 100 includes a secure remote commerce initiator (SRCi) 126 and multiple software development kits or SDKs 128 and 130. The SDK 128 is associated with and/or provided by the payment network 104, while the SDK 130 is associated with and/or provided by the payment network 106. Each of the SRCi 126 and the SDKs 128 and 130 includes executable instructions, which are included in the virtual location 113 of the merchant 102 and, therefore, are executable at the communication device 116 (and in particular, at the web browser 115 thereof) in connection with remote payments by the consumer 114 at the virtual location 113. In this exemplary embodiment, each of the SRCi 126 and the SDKs 128 and 130 are written in JavaScript®, but it should be appreciated that they may be provided in other programming languages in other embodiments.

In view of the above, when the consumer 114 seeks to checkout at the virtual location 113 of the merchant 102 (and purchase one or more products selected by the consumer 114 through the virtual location 113), the communication device 116, as configured by the SRCi 126 (when executed or run by the web browser 115), provides one or more different requests to the SDKs 128 and 130. The communication from the SRCi 126 is generally the same for each of the SDKs 128 and 130, as it is based on a consistent standard across multiple SRCi's (in other PSPs and/or merchants, etc.). In turn, the communication device 116, as configured by the SDKs 128 and 130 (when executed or run by the web browser 115), converts or translates the request(s) into either an API call or a DCF call, which are consistent with the API 118 and the DCF 122 (for the payment network 104), for the SDK 128, and which are also consistent with the API 120 and DCF 124 (for the payment network 106), for the SDK 130. More generally, the SDKs 128 and 130 are configured to abstract communication from the SRCi 126 (a standard communication to each) to the APIs 118 and 120, respectively, and to abstract the passing of data to the DCFs 122 and 124, respectively, and transition the use experience from the SRCi 126 to the DCFs 122 and 124, respectively.

In the exemplary embodiment (but not required in all embodiments), the remote payments are consistent with the secure remote commerce standard, which is provided from EMVCo®.

While one merchant 102, two payment networks 104 and 106, one issuer 108, one PSP 110, one consumer 114, and one communication device 116 are illustrated as included in the system 100, it should be appreciated that any number of these entities and/or persons (and their associated components) may be included in the system 100, or may be included as a part of systems in other embodiments, consistent with the present disclosure.

Figure 2:
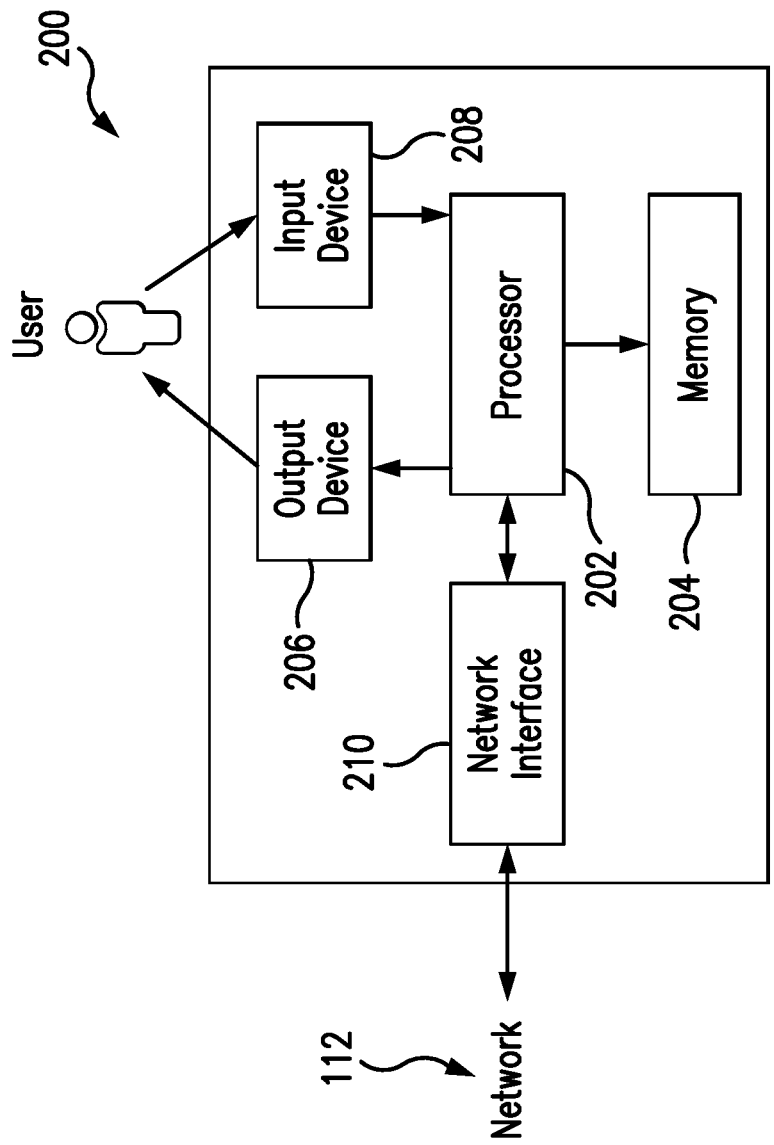
FIG. 2 is a block diagram of a computing device that may be used in the exemplary system of FIG. 1.

FIG. 2 illustrates exemplary computing device 200 that can be used in the system 100. The computing device 200 may include, for example, one or more servers, workstations, personal computers, laptops, tablets, smartphones, PDAs, POS devices, etc. In addition, the computing device 200 may include a single computing device, or it may include multiple computing devices located in close proximity or distributed over a geographic region, so long as the computing devices are specifically configured to function as described herein. In particular, in the exemplary system 100 of FIG. 1, each of the merchant 102, the payment network 104, the payment network 106, the issuer 108, and the PSP 110 are illustrated as including, or being implemented in, computing device 200, coupled to the network 112. In addition, the communication device 116 may be considered a computing device consistent with the computing device 200. That said, however, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, API calls, DCF calls, computer-executable instructions, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is performing one or more of the various operations herein (e.g., the performance of the communication device 116, the computing devices 200 at the various parts of the system 100, etc.). It should be appreciated that the memory 204 may include a variety of different memories, each implemented in one or more of the functions or processes described herein.

In addition in the exemplary embodiment, the computing device 200 includes an output device 206 that is coupled to (and is in communication with) the processor 202. The output device 206 outputs information (e.g., remembered payment account options, etc.), either visually or audibly, to a user of the computing device 200, for example, the consumer 114, users associated with other parts of the system 100, etc. Various interfaces may also be displayed at computing device 200, and in particular at output device 206, to display such information. The output device 206 may include, without limitation, a presentation unit such as a liquid crystal display (LCD), a light-emitting diode (LED) display, an organic LED (OLED) display, an "electronic ink" display; speakers; another computer; etc. In some embodiments, the output device 206 may include multiple devices.

The computing device 200 also includes an input device 208 that receives inputs from the user of the computing device 200 (i.e., user inputs) such as, for example, selections of payment account options, inputs of payment accounts to be added, etc. The input device 208 is coupled to (and is in communication with) the processor 202 and may include, for example, a keyboard, a pointing device, a mouse, a stylus, a touch sensitive panel (e.g., a touch pad or a touch screen, etc.), another computing device, and/or an audio input device. Further, in various exemplary embodiments, a touch screen, such as that included in a tablet, a smartphone, or similar device, may behave as both the output device 206 and the input device 208.

In addition, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to/with one or more different networks, including the network 112. Further, in some exemplary embodiments, the computing device 200 may include the processor 202 and one or more network interfaces (including the network interface 210) incorporated into or with the processor 202.

Figure 3:
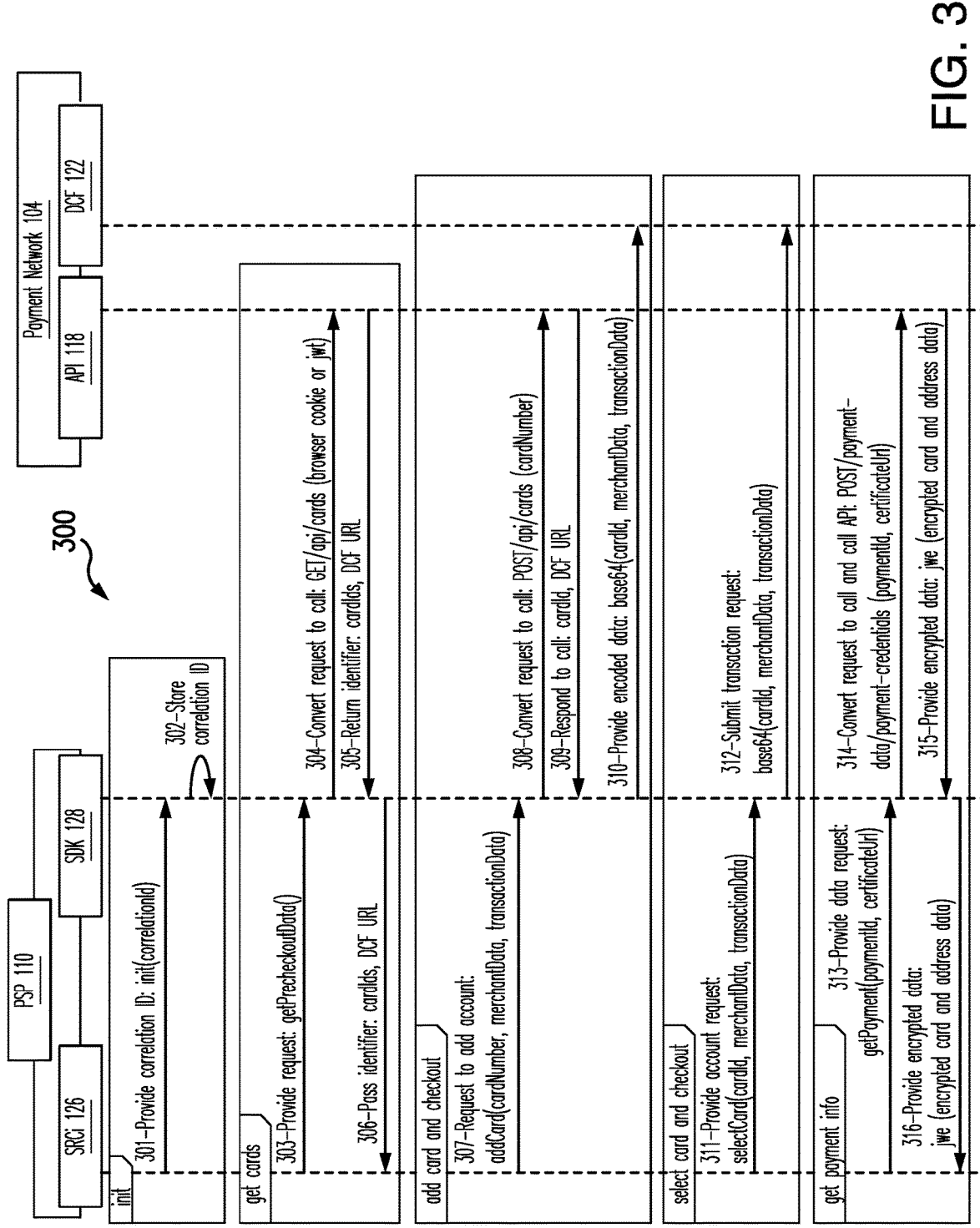
FIG. 3 is an exemplary method that may be implemented in the system of FIG. 1 for facilitating a payment account transaction by a consumer at a virtual location of a merchant.

FIG. 3 illustrates an exemplary method 300 for use in facilitating payment account transactions, by one or more consumers, at a virtual location associated with a merchant. The exemplary method 300 is described with reference to the system 100, and in particular to the payment network 104, the PSP 110, the API 118, the DCF 122, the SRCi 126, and the SDK 128 included in the system 100. Further reference is also made to the computing device 200. However, it should be understood that the method 300 (and other methods herein) are not limited to the system 100 or the computing device 200, as the method 300, for example, may be implemented, at least in part, in other parts of suitable systems, or in multiple other computing devices or systems. Likewise, the systems and the computing devices herein (including the system 100 and the computing device 200) should not be understood to be limited to the exemplary method 300.

In the exemplary method 300, at 301, the SRCi 126 initializes (e.g., as part of an initialization operation (or "init" operation, as indicated in FIG. 3), etc.) by providing a correlation ID (i.e., "correlationId") to the SDK 128. For instance, the SRCi 126 may randomly generate the correlation ID (such that the correlation ID is a randomly generated value (e.g., a UUID (universally unique identifier), etc.)) and then provide it to the SDK 128. As such, the initialization is included, in method 300, in this example, to provide (and/or generate) the correlation ID, which may be employed by the SRCi 126 and/or the SDK 128 (or other aspect of the system 100 illustrated in FIG. 1) to identify requests, messages, etc. to a session, thereby permitting a link between the requests, messages, etc., and also permitting, for example, debugging and/or analytics related to the requests, messages, etc., or to session by or for different parts of the system 100 of FIG. 1, to be performed. In response to the initialization, at 302, the SDK 128 stores the correlation ID in memory (e.g., the memory 204 associated with the PSP 110, etc.) and, subsequently, includes the correlation ID in a request to the payment network 104 (e.g., at 303 and 304, etc.), and in particular, a request to the API 118 and/or the DCF 122 associated with the payment network 104 (e.g., in the HTTP header of the request(s), etc.).

Thereafter, in connection with the consumer 114 initiating a checkout at the virtual location 113 of the merchant 102, the SRCi 126 provides a checkout interface to the consumer 114, at the communication device 116, which includes the option to provide payment account credentials through remote payment and, when the option is selected, the SRCi 126 provides a "get card" request (or get payment account request) to the SDK 128, at 303. The get card request, which is associated with the call "getPrecheckoutData( )", for example, is directed to the SDK 128, which in turn, converts the call to the API 118, at 304, which may be named the "get" or "get cards" API (and which is shown as "GET/api/cards" in FIG. 3). In this embodiment, when the consumer 114 has previously opted to have one or more payment accounts remembered from a previous checkout or multiple previous checkouts through the virtual location 113 (or potentially through other virtual locations of other merchants), the web browser 115 will have dropped a cookie including the device ID for the communication device 116 (as indicated below). The web browser 115, at the communication device 116, will then include the cookie and/or the device ID from the cookie in the request, by the SDK 128, to the payment network 104. As such, in this embodiment, unlike other data, the cookie is not given to the SDK 128. Rather, it is an "http only cookie" whereby it is not seen by the SDK 128. The cookie is associated with a domain (e.g., API service, etc.) when the cookie is set, and thus the web browser 115 includes the cookie with the request to that API 118—it happens automatically between the web browser 115 and the API 118, for example.

As an alternative to the cookie (or in addition to the cookie), a web token (e.g., a JSON web token (jwt), etc.) may be used (and which may then include the device ID for the communication device 116), wherein the web token is also based on identifying information about the consumer 114, such as, for example, an email address, a phone number, etc.

In response to the get card request, the API 118 (and, more generally, the payment network 104) uses the cookie to look up the payment account(s), if any, associated with the consumer 114 (i.e., previously used and remembered payment accounts), and returns, at 305, the card IDs (i.e., "cardids") (or other suitable identifier) for the identified payment account(s) along with a DCF URL to the SDK 128. In this example, the card IDs include the masked card data for the payment accounts. The SDK 128, in response, passes the card IDs and the DCF URL to the SRCi 126, at 306. In turn, the SRCi 126 presents the payment account(s) associated with the card IDs identified from the payment network 104 (and also from the other payment networks (e.g., the payment network 106, etc.)) to the consumer 114 in an interface at the communication device 116 (e.g., via the web browser 115, etc.).

The consumer 114 is then able to select a payment account from the interface, from the payment account(s) presented to the consumer 114 by the SRCi 126, to thereby initiate checkout, as described below, based on the selected payment account.

When the payment account to be used by the consumer 114 has not been previously used, or the consumer 114 has opted not to have a payment account remembered, the consumer 114 may opt, in an interface from the SRCi 126, to add a payment account to the remote payment option and to checkout with that payment account. Specifically, then, the SRCi 126 submits, at 307, an add card request (i.e., an "addCard" request) to the SDK 128, which includes a payment account number (i.e., a "cardNumber", which may be a primary account number (PAN), a token, etc.), along with merchant data (i.e., "merchantData", which includes the merchant identifier, merchant name, merchant preferences, merchant address, transaction identifier, etc. for the given merchant 102), and/or transaction data (i.e., "transactionData", which includes the transaction amount, location, type of cryptogram, currency, etc.).

In response to the add card request, the SDK 128 converts, at 308, the request to a call to the API 118, which is named "POST/api/cards" (e.g., via an XHR/AJAX request in the web browser 115, etc.). The call includes the payment account number for the consumer's selected payment account and a device ID for the communication device 116. In turn, in this exemplary embodiment, the payment network 104 stores the payment account number (e.g., in memory 204 associated therewith) (in an object) in association with the device ID for the communication device 116, and assigns a card ID thereto. The payment network 104 then responds to the call, via the API 118, with a card ID for the payment account and with the DCF URL, at 309.

Upon receipt of the card ID and DCF URL, the SDK 128 encodes the data to be provided to the DCF 122. Specifically, the data is encoded by saving the data in a JavaScript® object and converting the data to a string format (e.g., JSON format, etc.) and then encoding that string via web safe base 64. An example code segment is presented below for the encoding operation:

encodedata=window.btoa(JSON.stringify(data))
        .replace(/\+/g, '-') // Convert '+' to '-'
        .replace(/\//g, '_') // Convert '/' to '_'
        .replace(/=+$/, ' ') // Remove ending '='

The SDK 128 then appends the encoded data, or part thereof, as a parameter of the DCF URL, and directs the web browser 115 to the DCF URL, at 310, with the encoded data being included as part of the URL and/or preloaded to the URL, thereby providing the data to the DCF 122. The DCF 122 is then permitted to proceed to authenticate the consumer 114 and/or facilitate the transaction (e.g., request a payment token from a token provider in the payment network 104, etc.), as necessary or desired. As part thereof, a payment identifier or payment ID for the payment account transaction with the virtual location 113 is generated, retrieved or received, and provided to the PSP 110. Moreover, although not shown in FIG. 3, after receiving the card ID from the payment network 104, the web browser 115 either now or at some time later (e.g., after the transaction is complete, etc.) drops a cookie for the communication device 116, which may be used, as described above, in the "get card" operation.

With reference to the above, when one or more payment accounts are returned in response to the get card operation, the consumer 114 is permitted to select one of the corresponding payment accounts to fund the payment account transaction. In response, the SRCi 126 provides a select payment account request to the SDK 128, at 311. In this embodiment, the request includes a "selectCard" request, which includes the card ID for the selected payment account, merchant data ("merchantData") for the merchant 102, and/or transaction data ("transactionData") for the underlying purchase, etc. In general, the data includes data necessary for the consumer 114 to checkout and/or the DCF 122 to facilitate the transaction, to be funded by the payment account selected by the consumer 114. The SDK 128 encodes the data, for example, according to a base 64 scheme, etc., as explained above (or otherwise) and submits a transaction request to the DCF 122, based on the DFC URL, at 312. The request, which is designated "base64" in FIG. 3, includes the card ID, the transaction data and the merchant data in this embodiment, but may include the same, different and/or other data in other embodiments.

With continued reference to FIG. 3, the method 300 further includes a "get payment data" (or payment information) operation, which is employed to get account data to facilitate the payment account transaction after the DCF 122 has authenticated the consumer 114 and provided a payment ID back to the PSP 110. In particular in this operation, the SRCi 126 provides, at 313, a get payment data request to the SDK 128, which is designated "getPayment" and includes a payment ID (i.e., a "transactionID") from the DCF 122 for the transaction and a certificate (i.e., "certificateURL"). The transaction ID is associated with the instant transaction, and the certificate is associated with the PSP 110 and includes a public key (i.e., of a public-private key pair associated with the PSP 110). In response, the SDK 128 converts the request and calls the API 118, at 314. In this example, the API 118 is named "post" as indicated by "POST/payment-data/payment-credentials" in FIG. 3 and includes the payment ID and the certificate from the SRCi 126. In response, the payment network 104 looks up the payment account credentials (e.g., a payment account number, a token, etc. in memory 204 thereof) associated with the payment ID, and potentially, address data for the transaction (e.g., the shipping or mailing address associated with the transaction (e.g., a consumer's name, street, city, postal code, country, etc.), etc.), and encrypts the data with the public key included in the certificate (i.e., the "certificateUrl"), and then, at 315, provides the encrypted data (i.e., encrypted card and address data) to the SDK 128, via JSON web encryption (jwe). Some transactions may require or request a shipping address that the consumer 114 will either enter or select from addresses stored in or known by the DCF 122. As such, in view of the above, the shipping address may be provided to the merchant 102 to facilitate shipping of a purchased product associated with the transaction (e.g., in connection with operation 316, or later; etc.). With further reference to FIG. 3, at 316, the SDK 128 provides the encrypted data (i.e., the encrypted card and address data, etc.) to the SRCi 126. The PSP 110, in this embodiment, is then able to match the data to a private key and use the private key to decrypt the data and pursue the payment account transaction to the payment account indicated, as is conventional.

As should be appreciated, in this manner, the SDK 128 performs to translate and/or convert the different requests from the SRCi 126 into calls to the API 118 and/or the DCF 122 of the payment network 104 (e.g., converts getPrecheckoutData to GET/api/cards, converts addCard to POST/api/cards and base64, etc.). Likewise, regarding the payment network 106, the SDK 130 performs to translate or convert similar requests from the SRCi 126 into calls to the API 120 and/or the DCF 124 of the payment network 106, which, in general though, will be different than the calls to the payment network 104. As such, the SRCi 126 is permitted to make the same requests to the SDKs 128 and 130, regardless of the manner by which the SDKs 128 and 130 communicate with the payment networks 104 and 106, respectively.

It should be appreciated that while only the SDK 128 is illustrated in FIG. 3 and described with regard to the method 300, the description herein is applicable to the SDK 130 and its interactions with the payment network 106. In general, those interactions will be duplicative of and/or in parallel with the interactions between the SDK 128 and the payment network 104, as shown in FIG. 3. As such, in response to a "get card" request, two responses will be received by the SRCi 126, at 306 (one from the payment network 104 and one from the payment network 106), and all the cards included in both responses will be displayed to the consumer 114 for selection. Separately, when the consumer 114 attempts to add a card (e.g., "add card and checkout", etc.) (or perform other operation specific to one or more payment networks), the request may be directed, by the SRCi 126 (or more generally, the web browser 115) to only one (or more) of the SDKs 128 and 130 to which the request is relevant, i.e., whichever SDK is associated with the payment network for the payment account to be added (e.g., based on a BIN or other part of the payment account number for the payment account, etc.).

Example code segments are presented below for encoding operations relating to various features of the system 100 and/or the method 300. It should be appreciated that the code segments are exemplary in nature and that other variations may be used in other embodiments.

Regarding the initialization operations described herein (e.g., at operations 301 and 302 in method 300, etc.), the following example code segment may be utilized to initialize an application:

```
init({
  required UUID correlationId; // generated by SRCi, same across all networks, passed to DCF
  required String apiKey; // identify which SRCi app
  optional URL host; // to override the default production location for internal APIs. ex. https://stage.network.com/
})
```

Regarding the get card operations described herein (e.g., at operations 303-306 in the method 300, etc.), the following example code segments may be utilized: Segment 1—to determine if a user is recognized and, if the user is recognized, to obtain a jwt to optionally pass, via a pre-checkout call, to another SRC; Segment 2—in connection with getting pre-checkout data, to take a jwt (or browser provided HTTP-only secure cookie) and return masked card data for a card selection; Segment 3—in connection with an ID lookup, to determine if a user exists for a one-time password (OTP) based on an email or phone number and return identifier(s) for OTP; Segment 4—to send an OTP message based on the type of ID provided (email or phone number);

and Segment 5—to provide a code to validate the OTP and to return a jwt of the identity of the user.

Example Code Segment 1:

```
SLA: 200ms
isRecognized( )
// Response
dictionary{
    optional JWT idToken;
}
// Errors
1000 - Not recognized
```

Example Code Segment 2:

```
SLA: 500ms
getPrecheckoutData(
    optional JWT idToken;
)
// Response
dictionary{
    optional Sequence<MaskedCard> cards;
    optional JWT              idToken;
}
// Errors
1000 - Invalid JWT
```

Example Code Segment 3:

```
idLookup(
    required UUID id;
    required Enum type; // 'email' or 'phone'
)
// Response
dictionary{
    required Sequence<Id> ids
}
dictionary Id{
    required Enum type; // 'email' or 'phone'
    required String maskedValue; // ex. 'foo@g***.com' or '***.***.1234'
    required UUID id; // to provide to sendOTP( )
}
// Errors
1000 - User not found
1001 - Unsupported Id format
1002 - Fraud
3000 - Server error
```

Example Code Segment 4:

```
sendOTP(
    required UUID id; // identifier of which entry from idLookup was
    selected
)
// Response
Void
// Errors
1000 - Invalid id
1001 - Could not send OTP
1002 - Retries exceeded
```

Example Code Segment 5:

```
verifyOTP(
    required String otp;
)
// Response
dictionary{
    required JWT idToken;
}
```

```
// Errors
1000 - Invalid Code
1001 - Code expired
1002 - Retries exceeded
```

Regarding the add card operations described herein (e.g., at operations 307-310 in the method 300, etc.), the following code segment may be utilized to add a card in response to card data and any additional data (e.g., relating to the merchant, the transaction, and the given configuration, etc.), to hand off to the DCF:

```
addCard(
    required Card         card;
    required MerchantData merchantData;
    required SRCI         srci; // callback location to return to
)
dictionary Card {
    required String pan;
    required Number expiryMonth;
    required Number expiryYear;
    optional String cvc2; // based on BIN cvc2 may not be provided
    optional String cardholderName;
}
// Errors
1000 - Unable to add card
1001 - Invalid card number
1002 - Invalid expiry
1003 - Invalid mercantData
1004 - Unable to connect to DCF
```

Regarding the select card operations described herein (e.g., at operations 311-312 in the method 300, etc.), the following code segment may be utilized to select a card for checkout based on the card selected (e.g., a card ID, etc.) for checkout and any related merchant data:

```
selectCard(
    required UUID         cardId;
    required MerchantData merchantData;
    required SRCI srci;    // callback location to return to
)
// Errors
1001 - Invalid card id
1002 - Invalid mercantData
1004 - Unable to connect to DCF
```

And, regarding the get payment info operations described herein (e.g., at operations 313-315 in the method 300, etc.), the following code segment may be utilized to get card data encrypted with the SRCi public certificate, along with masked card information and optional address information, for a transaction in plain text:

```
getPayment(
    required UUID paymentId; // returned by DCF to SRCi
    required URL  receiverCertificateUrl;
)
// Response
dictionary {
    required String       jwe; // Serialized form of jwe(jws(card))
    required MaskedCard   maskedCard;
    optional MaskedAddress maskedShippingAddress;
}
```

```
dictionary MaskedAddress {
  required UUID addressId;
  required String maskedAddressLine; // ex. '1** M*** St'
  required String countryCode;
  required String postalCode;
}
// Errors
1001 - Invalid paymentId
1002 - Invalid certificate
1003 - Unable to fetch certificate
1004 - PaymentId not found
```

In various embodiments of the present disclosure, a non-transitory computer readable storage media comprising executable instructions may be provided for facilitating payment account transactions at a virtual location of a merchant, which when executed by at least one processor, in connection with a web browser, cause the at least one processor to: (a) receive an add card and checkout request from an initiator, the add card and checkout request including a payment account number for a payment account associated with a consumer, merchant data for a merchant, and transaction data for a payment account transaction between the merchant and the consumer; (b) in response to the add card and checkout request: (i) transmit an API call to a payment network associated with the payment account; (ii) receive a card ID for the payment account and a digital card facilitator (DCF) URL from the payment network; and (iii) transition the initiator to a DCF associated with the payment network, via the DCF URL, thereby permitting the payment network to authenticate the consumer and/or to provide payment account credentials for the payment account for use in the payment account transaction. In one or more of these embodiments, the initiator may include the merchant.

In various embodiments of the present disclosure, a non-transitory computer readable storage media comprising executable instructions may be provided for facilitating payment account transactions at a virtual location of a merchant, which when executed by at least one processor, in connection with a web browser, cause the at least one processor to: (a) receive a select card and checkout request from an initiator, the select card and checkout request including a card ID for a payment account associated with a consumer, merchant data for a merchant, and transaction data for a payment account transaction between the merchant and the consumer; and (b) in response to the select card and checkout request, transition the initiator to a digital card facilitator (DCF) associated with a payment network, thereby permitting the payment network to authenticate the consumer and/or to provide payment account credentials for the payment account for use in the payment account transaction. In one or more of these embodiments, the instructions, when executed by the at least one processor, in connection with the web browser, may further cause the at least one processor to (a) encode the card ID, the merchant data, and the transaction data and (b) append the encoded data to a DFC URL associated with the DCF. In addition, in one or more of these embodiments, the instructions, when executed by the at least one processor, in connection with the web browser, may additionally cause the at least one processor, in order to transition the initiator to the DCF, to transition the initiator to the DCF based on the DFC URL with the appended encoded data.

In view of the above, the methods and systems herein provide SDKs, for use by remote payment platforms, whereby standard network transactions are converted to network transactions specific to particular payment networks (e.g., as a common interface to all payment networks, as an abstraction on top of SRC APIs and corresponding libraries that access the SCR APIs for use in controlling transition between applications in checkout processes, etc.). In this manner, the remote payment platforms are able to integrate with different payment networks, by including SDKs specific to the payment networks (whereby they may be shared across the payment networks), while avoiding redefining and/or revising internal standards and/or internal requests. As can be appreciated, this provides a practical application in addressing remote payment options that involve multiple payment networks (where the remote payment options may be specific to one of the payment networks, or specific to a virtual wallet platform), and where it is needed to provide communication specific to each of the payment networks to facilitate the underlying payment account transactions. This may also provide practical application in that error responses in the systems and methods may be generally standardized, etc. (e.g., in view of the defined request objects and the defined response objects, etc.).

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and without limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) converting, by a communication device, a request from a remote payment initiator associated with a merchant into a message to a payment network, via a software development kit (SDK) executed by a web browser of the communication device; (b) converting a request to an application programming interface (API) call to the payment network; (c) receiving the card ID and a digital card facilitator (DCF) URL and providing the card ID and the DCF to the remote payment initiator in response to the request; (d) receiving the card ID for the payment account and the DCF URL and directing the card ID to a digital card facilitator; and (e) transitioning the initiator to the DCF.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in facilitating payment account transactions at a virtual location of a merchant, the method comprising:
    receiving, by a communication device, via execution of a software development kit (SDK) of a virtual location of a merchant by a web browser of the communication device, a correlation ID from a remote payment initiator of the virtual location, wherein the SDK is specific to a payment network;
    receiving, by the communication device, via execution of the SDK, a request from the remote payment initiator to identify at least one payment account for use in a transaction by a consumer at the virtual location of the merchant;
    converting, by the communication device, via execution of the SDK, the request from the remote payment initiator into a get card message to the payment network, the get card message in a format specific to the payment network associated with the SDK, the get card message including the correlation ID and a browser cookie associated with the web browser;
    transmitting, by the communication device, the get card message to the payment network;
    receiving, by the communication device, via execution of the SDK, a get card response from the payment network, the get card response including a digital card facilitator (DCF) URL and one or more card IDs of the at least one payment account;
    providing, by the communication device, the one or more card IDs and the DCF URL to the remote payment initiator;
    receiving, by the communication device, via execution of the SDK, a checkout request for the transaction from the remote payment initiator, the checkout request including a card ID of the one or more card IDs and at least one of merchant data and/or transaction data for the transaction; and
    transmitting, by the communication device, a transaction request to the DCF associated with the payment network based on the DCF URL included in the get card response, the transaction request including the card ID and the at least one of the merchant data and/or the transaction data included in the checkout request.

2. The method of claim 1, wherein the get card message includes an application programming interface (API) call to the payment network.

3. The method of claim 1, further comprising transitioning the remote payment initiator to the DCF and wherein the transaction request includes the card ID and the merchant data for the merchant included in the checkout request.

4. A non-transitory computer readable storage media comprising executable instructions for facilitating payment account transactions at a virtual location of a merchant, which when executed by at least one processor, in connection with a web browser, cause the at least one processor to:
    receive a get payment account request from an initiator of a payment service provider in connection with checkout by a consumer for a transaction at the virtual location of the merchant, the get payment account request including at least one of a browser cookie and a web token indicative of the consumer, wherein the payment service provider is separate from the merchant;
    convert the get payment account request into a GET API call to a payment network, the GET API call including the at least one of a browser cookie and a web token indicative of the consumer;
    in response to the GET API call, receive a payment account identifier and a digital card facilitator (DCF) URL from the payment network;
    provide the payment account identifier and the DCF URL to the initiator, thereby permitting the initiator to present a payment account to the consumer associated with the payment account identifier for selection by the consumer to fund the transaction;

receive a checkout request from the initiator, the checkout request including the payment account identifier; and provide the payment account identifier to the DCF associated with the payment network based on the DCF URL.

5. The non-transitory computer readable storage media of claim 4, wherein the payment account request includes a device ID for a communication device at which the web browser is accessed.

6. The non-transitory computer readable storage media of claim 5, wherein the web browser, at the communication device, includes the browser cookie and/or the device ID in the payment account request as converted to the GET API call.

* * * * *